INVENTORS,
HARRY L. MILLER
HERMAN C. KURTZ
BY Fay, Gobrick & Fay
ATTORNEYS

Aug. 24, 1954  H. L. MILLER ET AL  2,686,998
HYDRAULICALLY DRIVEN RECIPROCATING MOWER
Filed Sept. 16, 1950  4 Sheets-Sheet 2

INVENTORS,
HARRY L. MILLER
HERMAN C. KURTZ
BY Fay, Golrick & Fay
ATTORNEYS

INVENTORS,
HARRY L. MILLER
HERMAN C. KURTZ
BY Fay, Gobrick & Fay
ATTORNEYS

Patented Aug. 24, 1954

2,686,998

UNITED STATES PATENT OFFICE 2,686,998

HYDRAULICALLY DRIVEN RECIPROCATING MOWER

Harry L. Miller, Parma Heights, Ohio, and Herman C. Kurtz, San Diego, Calif.

Application September 16, 1950, Serial No. 185,204

4 Claims. (Cl. 56—25)

This invention is concerned with improvements in hydraulically powered mowers operated by internal combustion engine tractors for cutting road weeds and grass and one object thereof is the provision of a hydraulic system that utilizes the fluid cooling system of the tractor engine as part of the hydraulic transmission system for operating the cutter blade of the mower.

Another object of the present invention is the provision of a hydraulically powered motor and mechanical connections between the motor and cutting blade for reciprocating the cutting blade in a direct and balanced manner.

A further object is the provision of a mower or vegetation cutting mechanism and a hydraulically powered actuator so arranged as to be operable in a considerably increased range of angular positions relative to a horizontal plane.

A still further object of the present invention is the provision of a mechanical motion which will permit reciprocation of the cutting blade at relatively increased speeds without resulting deteriorating vibration.

Still another object is the provision of a hydraulically operated mowing device which can be operated at such speeds as to increase the speed of road movement of the tractor.

A still further object is the provision of a hydraulic drive for a reciprocating mower which will avoid the use of compensating means when the cutting unit is operated in either an angularly up or down position relative to a normal position.

A still further object of the present invention is to provide a direct drive arrangement between a rotary hydraulic motor and the cutting blade or knife of a reciprocating mowing mechanism.

A still further object is the provision of a hydraulically operated reciprocating mower which will stall without damage thereto when an uncuttable object is encountered by the cutting blade.

Other objects and advantages of the invention will be apparent from the following detailed description of preferred forms of embodiment of the invention, reference being made to the accompanying drawings wherein—

Our invention contemplates the further development and perfection of the heretofore general proposal of a hydraulic drive especially for a tractor-carried roadway mower thereby to overcome several practical difficulties which have stood in the way of acceptance of such generally desirable proposals. One difficulty of outstanding seriousness was that hydraulic motors of the piston reciprocative type were proposed as the motor means for reciprocating the cutting blade resulting in added reciprocating momentum and inertia problems manifested in violent vibrations that required added weight and increased cumbersomeness in the supporting or suspending means for the mower unit. Also, such arrangements stood in the way of any increasing in the speed of operation of the cutting bar. In some instances this speed was decreased to reduce vibration with a resulting decrease required in the road speed of the tractor and in the ultimate amount of work accomplished in a day. This condition prevailed even though the development of small sized high pressure hydraulic pumps made available a suitable source of hydraulic power.

We have determined that by eliminating pitman and connecting rod mechanisms heretofore proposed as the mechanical transmission means between a rotary hydraulic motor and the reciprocating cutting blade the hydraulic motor can be used successfully. By the use of a crank actuated element reciprocably disposed in close proximity to the plane of the path of reciprocation of the cutting blade practically all troublesome vibration may be eliminated. With the harmful vibrations thus eliminated we find it possible to operate the mower mechanism at considerably higher reciprocating speeds, thus permitting the tractor to cover considerably greater mowing mileage per day than was heretofore possible. In the instant disclosure the hydraulic pump can be operated at the rate of 1200 revolutions per minute to deliver 1000 pounds hydraulic pressure at a displacement of about 15 gallons per minute, with the cutter bar operating at 2400 reciprocations per minute in contrast to the 1200–1300 strokes per minute rate of the old conventional type mowers. Satisfactory operation has been obtained with a 3200 stroke rate with the tractor moving at 10 miles per hour.

Figure 6:
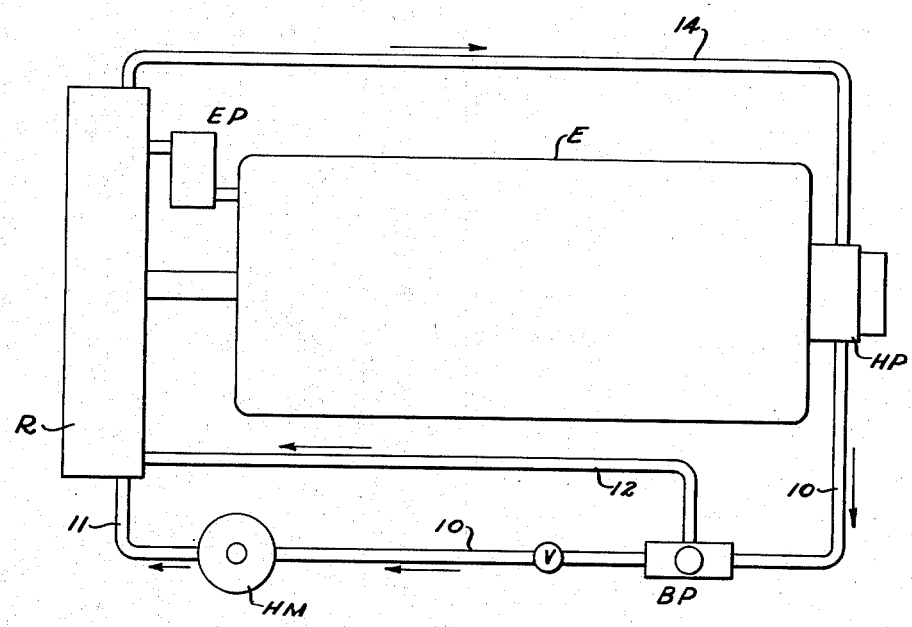
Fig. 6 is a diagrammatic representation of a hydraulic system wherein the circuit includes the cooling system of the tractor engine.

The hydraulic system, to accommodate the foregoing, should be such that the pump displacement will not necessarily be dependent upon the road speed of the tractor and this can be effected by having the speed of the pump adequate, at average road speed of the tractor power plant or engine, to deliver the hydraulic fluid to the motor at full speed and pressure rating of the hydraulic motor. At engine speeds above the selected normal or average, the surplus fluid is by-passed to a low pressure reservoir which, as illustrated in Fig. 6, can be the radiator and cooling circuit or system of the engine. We have found that the customary road speeds of from 4 to 6 miles per hour can be increased considerably.

Figure 1:
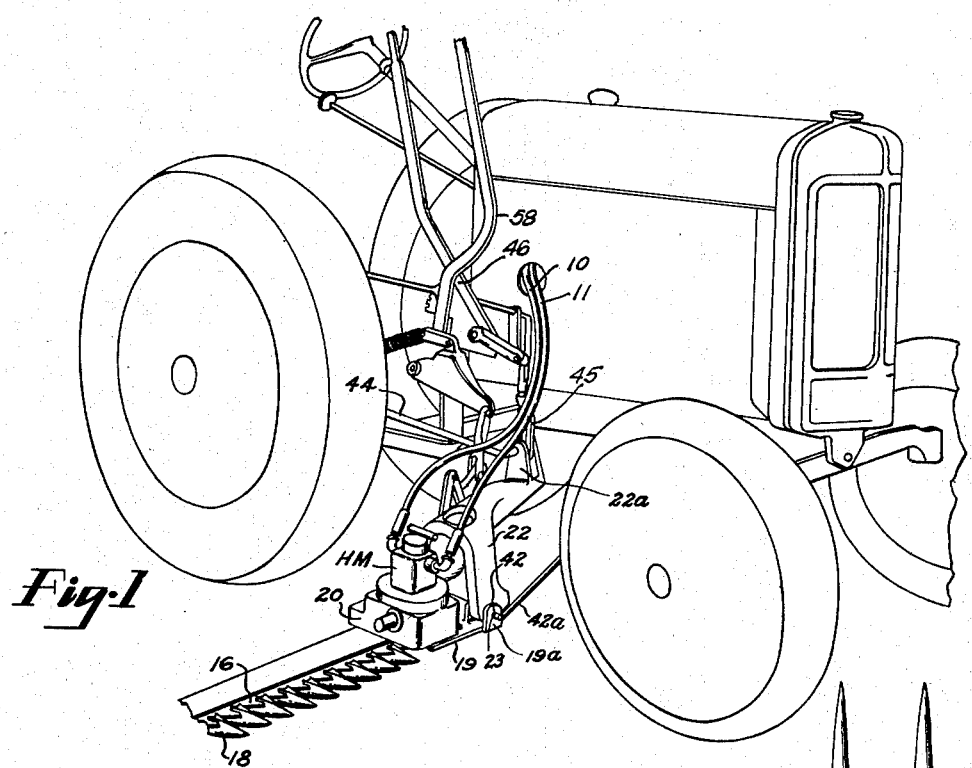
Fig. 1 illustrates in perspective a road tractor and mowing device which incorporate the various features of our invention.

Referring to the drawings, in Fig. 1 we have shown the mower mechanism suspended in a mowing or operating position and as attached to the side of the tractor in convenient location for observation by the tractor operator. The manner of suspending the mower mechanism may be conventional, i. e., in the form of a readily removable attachment, if desired. One important departure from the conventional suspension may be made, however, in that none of the suspension or supporting elements need to be disposed beneath the tractor frame or chassis to support power take-off connections. In the present instance the hydraulic pump HP (see Fig. 6) is mounted adjacent to or on the engine E and is connected on its pressure side to the motor HM by duct 10. A pressure limiting by-pass valve mechanism BP is in the pressure line 10 to by-pass the surplus fluid through a by-pass line 12 to a reservoir or the engine radiator R. A cutter bar rate control valve V may be included in line 10 or its function incorporated in the by-pass valve by means of which the cutter stroke rate may be varied from zero to the maximum under the selected conditions. The discharge side of the motor HM is connected to the reservoir by the line 11. As shown diagrammatically in Fig. 6, the intake line 14 of the pump HP is connected to the reservoir R. When the reservoir is the tractor engine radiator the connections 11 and 14 are made thereto in such manner and location as to not interfere with the proper cooling system circulation function of the engine pump EP. Referring to Fig. 1 of the drawings it will be noted that the parts of the lines 10 and 11 which extend to the motor HM are flexible conduits or hose extending through the engine hood.

The mower mechanism comprises the reciprocating cutting blade 16 supported by rake bar 18 having an inner end or head 19 provided with upwardly extending pivot mounting bosses 19a. Mounted upon the head 19 in close proximity to the cutting blade 16 is a transmission housing 20, the top of which forms a mounting base for the rotary hydraulic motor HM. The mower unit described is pivotally suspended on an inverted U-shaped member 22 by pivot connections 23 with two pairs of lugs 19a in such manner that the entire mower unit may be swung upwardly to a vertical position without interference between motor HM and housing 20 and the U-shaped member 22. While suspension means and associated manipulating and control means are generally of a known form, modification and some simplification thereof becomes possible by the use of our invention, as will be set forth hereinafter.

Figure 2:
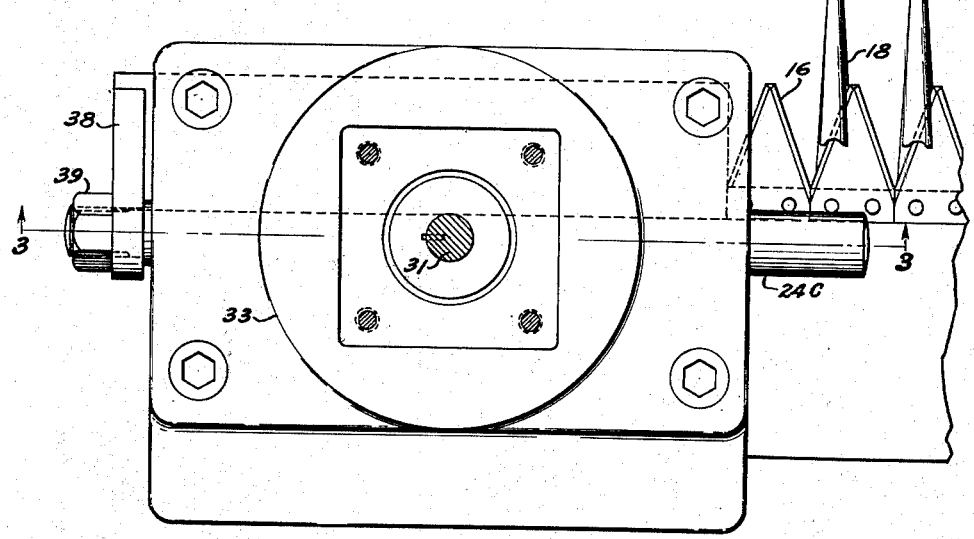
Fig. 2 is an enlarged plan view of the hydraulic transmission for operating the cutting blade or knife and part of the mowing mechanism.
Figure 3:
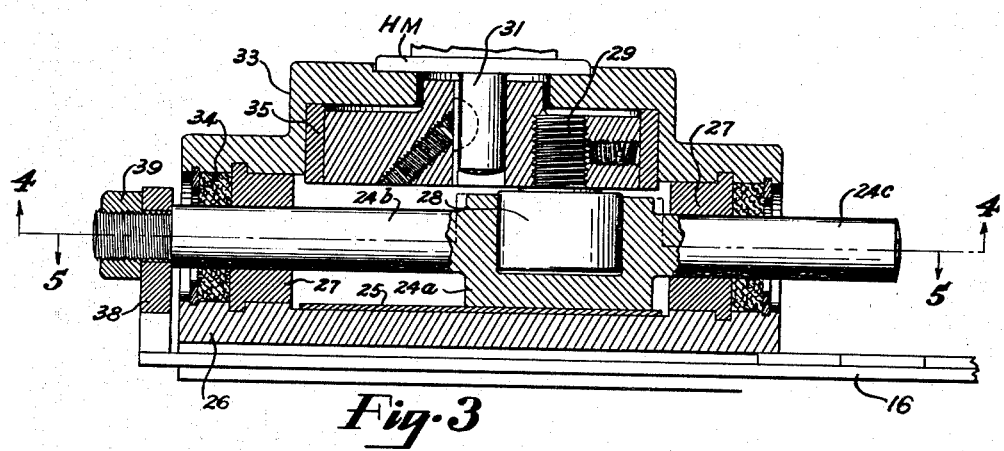
Fig. 3 is a cross-sectional view taken through the transmission along a vertical plane indicated by the line 3—3 of Fig. 2.
Figure 4:
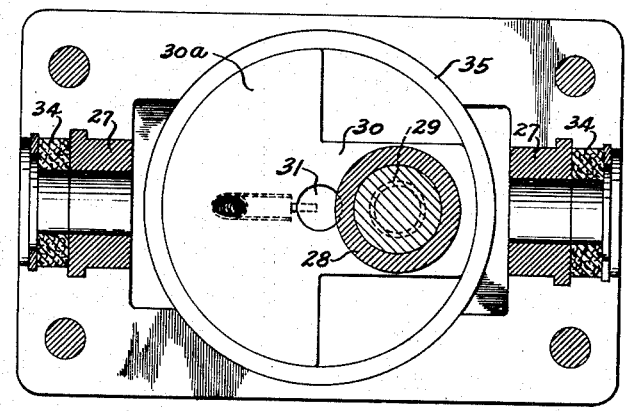
Fig. 4 is a cross-sectional view taken along the line 4—4 of Fig. 3.
Figure 5:
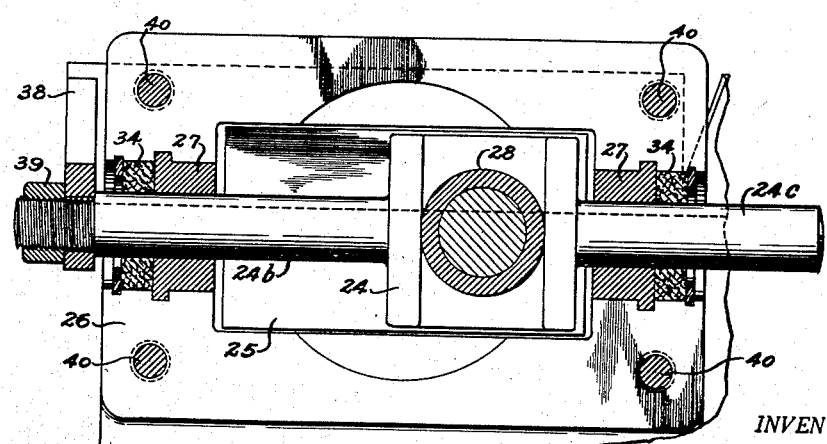
Fig. 5 is a cross-sectional view similar to that of Fig. 4 but taken in the direction indicated by the line 5—5 of Fig. 3.

As stated, the transmission mechanism between the hydraulic motor and the cutting blade 16 is of such mechanical character as to be operatively disposed in close proximity to the blade path and comprises a yoke member having a roller slot disposed normal to the reciprocating motion of the cutting blade and the housing 20 providing a slide structure. Referring to Figs. 1 to 3, inclusive, a slide member 24 is provided with a slide shoe portion 24a which slidably bears upon a flat bearing pad 25 secured to the floor of the bottom wall 26 of the housing 20. The slide structure 24 has an upwardly extending open slot formation for the reception of an anti-friction roller 28 which is carried by a crank pin 29 on a crank member 30. The slide structure is provided with aligned oppositely extending guide rods 24b and 24c slidably supported by bearing sleeves 27. The crank pin is carried by a crank arm 30 fixed to the lower end 31 of the rotary hydraulic motor HM. The crank arm 30, pin 29 and roller 28 are counterbalanced by counterweight 30a. The top wall 33 of the housing 20 is shaped to enclose the crank and to support a bearing ring 35 in bearing contact with circumferential surfaces of the crank structure and its counterweight. While the crank structure 30—30a is shown as being keyed and locked to the motor shaft and ostensibly thus rotatably supported, we have found it advisable to provide the bearing arrangement 35 to prevent distortion of the comparatively small motor shaft.

The slide rods 24b and 24c extend out of the housing and packing glands 34 serve to retain lubricant within the housing. The rearwardly extending rod 24b has the outer end thereof shouldered and threaded to afford connection to a short connecting member 38 held in engagement with the rod 24b by a nut 39. Member 38 extends downwardly and is connected to the end of the cutting knife 16 in a suitable manner. It will be noted that the under side of the housing structure 20 is formed to provide a passageway for the knife to extend therebeneath, thereby to permit the type of connection described. The under side of the housing may also be provided with an aligning spline or key connection with the cutter bar head. The mechanical arrangement described, apart from its relatively vibrationless functioning has the advantage of compactness and the operating parts can be encased in an oil sealed manner and the housing 20 can be retained in place on the cutter bar head simply by four bolts 40 which secure the housing to the bar head.

Figure 7:
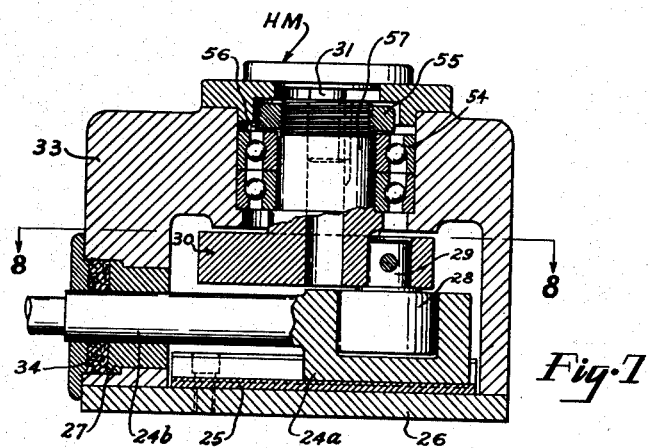
Fig. 7 is a cross-sectional view similar to Figure 3 of a modified form of the transmission.
Figure 8:
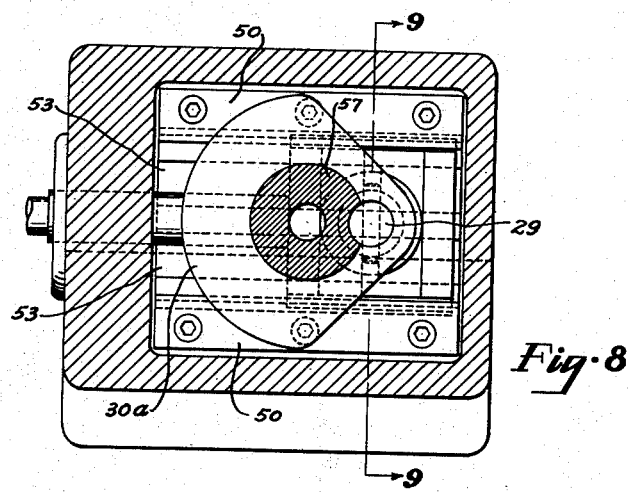
Fig. 8 is a cross-sectional view taken along the line 8—8 of Fig. 7.
Figure 9:
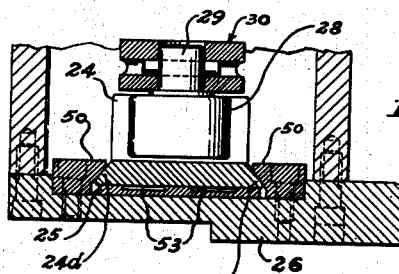
Fig. 9 is a vertical cross-sectional view taken along the line 9—9 of Fig. 8.

In Figs. 7 to 9 inclusive another form of the mower transmission unit of this invention is shown, in which like numerals designate parts corresponding to those of Figs. 2 to 5. This modification differs from the form above described chiefly by the bearing system used for the crank member 30, and in the use of a gib structure to guide the slide structure 24 in place of the guide rod 24c and bearing sleeve 27. The guide rod 24b may be connected to cutter blade 16 by structures similar to those shown in Fig. 3 (not shown in Figs. 7 to 9 inclusive). Gibs 50 bolted to the bottom wall 26 of the transmission unit housing, guide the slide structure 24, here provided with sloping side portions 24d, which dovetail into the gib members 50. The flat bearing pad 25 is here shown with longitudinal lubrication channels 53. The top wall 33 of the transmission housing supports the outer races of the roller bearings 54, while the inner races thereof are secured by a locknut 55 and washer 56 to the shouldered hollow shaft 57 of crank arm 31.

Referring again to the suspension means shown in Fig. 1, the member 22 may comprise a support for the mower unit as well as a support for links and levers forming part of the means for swinging and suspending the mower unit in various angularly disposed mowing positions that would correspond to the slopes of the terrain being mowed. As hereinbefore mentioned, the member 22 in its supporting relation to the power unit is such that the unit can be swung to a vertical position when the tractor is in non-mowing transit. As distinguished from mechanical power take-offs no compensating mechanism whatever is required in our device when such dispositions of the mowing unit are made. This is true also when it is desired to have the mowing unit mounting or suspension of such structure that the cutter bar can be tilted relative to the surface being mowed.

In the arrrangement here disclosed the member 22 is shown pivotally connected to the bar head lugs or bosses 19a by a bar 42 having a right-angled extension 42a reaching to the chassis of the tractor. A similarly shaped bar 44 has a section thereof bearing in the bifurcated formation 22a extending upwardly at the inner end of the member 22. A rearwardly extending section of bar 44 is pivotally connected to the tractor chassis. The bar end extending through the lugs 22a comprises a pivot for a link 45 connected through levers to a manually or hydraulically operated lever 46 which serves to regulate the clearance between the ground and the cutter bar head. The manually or hydraulically operated lever 58 is connected through a series of linkages and levers to swing the mower unit to various angular or slope cutting operations and only part of this mechanism is shown merely to indicate the adaptability and environment of our invention. Neither is the outer end of the cutter bar structure shown, but it may comprise the usual shoe with or without swathboard.

It is to be understood that the yoke member 24 could be secured directly to the upper face of the cutting knife by omitting the floor of the housing, thus eliminating the guide rod portions 24a and 24b and the rigidly connected member 38. However, the leakage of lubricant from the housing would require frequent attention and the blade would have a tendency to bring fine dirt or dust into the housing. For these reasons we prefer to have the yoke mechanism housed and operatively supported as disclosed.

The motor HM is of the rotary gear type and the oil under pressure therein acts as a cushion to absorb a considerable part of the shock of the reciprocating parts when the motion thereof is being reversed. The circumferential surfaces of the crank arm and its counterweight part are provided preferably with a ground bearing finish to assist the motor shaft in maintaining the crank mechanism in a reasonably accurate rotatively concentric relation to the motor axis.

Several advantageous features are obtained by the manner of operation of the power transmission disclosed in that the reactive forces incident to the operation of any reciprocating mechanism can now be reduced to a minimum and be distributed in directions which will prevent vibratory or harmonic build up. By devising a practical manner of utilizing a rotary hydraulic motor on the bar head it is possible to operate the cutting knife at a greatly increased speed. In one instance of installation the knife was reciprocated as high as 3000 strokes per minute while the tractor could be driven at road speeds heretofore unattainable for efficient, clean-cut mowing. The speed of the motor is not dependent upon either the forward or reverse speed of the tractor. The wear of the mower parts is reduced to a minimum by reason of the direct parallel thrust of the transmission means upon the knife and by reason of the balanced operating condition of the transmission parts. The shocks due to inertia at the time of reversing the movement of the knife are passed back to the motor and are absorbed by the fluid therein.

Other advantages are to be found in that the self-contained unitary mowing mechanism can be mounted (whether on the side or the front or the rear of a road tractor) in a more simple manner, thus permitting higher curb adjustments on the operating positions of the mower unit. We have found that a motor of light weight construction can be used and have used a five-pound motor with satisfaction. Such performance would not be possible without destructive results should pitmans and other unbalanced mowing elements be used in the transmission. Furthermore, the operating parts of the transmission can be completely housed, balanced and lubricated as has been disclosed.

By utilizing the hydraulic system illustrated in Fig. 6 of the drawings the temperature of the hydraulic fluid can be kept to a sufficiently low temperature to permit high speed operation of the mowing mechanism and a fluid can be used which would have anti-freeze characteristics, but which would be suitable as a hydraulic transmission medium. Extra tanks and ancillary equipment thus would be eliminated.

We claim:

1. In a hydraulically operated mower, a cutter bar and reciprocating knife, a housing mounted on the bar, a slide member slideably mounted in the housing and extending through a rear wall of the housing for motion parallel to the direction of reciprocation of said knife, said slide member having a slot transverse to its direction of motion, connecting means rigidly connecting said slide member to the extension of the knife, a rotary member journalled in said housing, a cylindrical roller in said slot with axis at right angles to the direction of motion of said slide member and to the length of said slot, and means rotationally mounting said roller eccentrically on said rotary member, whereby said knife is reciprocated upon rotation of said rotary member, said rotary member including counter-weight means to counter-balance said roller and roller mounting means and being adapted to receive a driving motor shaft in coaxially aligned driving engagement.

2. A structure as described in claim 1 including slide member guide means comprising slideway members secured in the housing and engaging said slide member; guide rod means rigidly secured to and extending from said slide member parallel to the direction of reciprocation of said knife, guide bearing means in said housing for said rod means and a packing gland structure associated with the rod bearing structure affording a lubricant seal of the housing when said knife and guide rod means are reciprocated.

3. In a hydraulically operated mower, a cutter bar and reciprocating knife, a housing mounted on the bar with said knife passing therebeneath, a slide member slideably mounted in the housing for motion parallel to the direction of reciprocation of said knife, said slide member having a slot transverse to its direction of motion, connecting means exterior of the housing rigidly connecting said slide member to said knife, a rotary member journalled in said housing, a cylindrical roller in said slot with axis at right angles to the direction of motion of said slide member and to the length of said slot, means rotationally mounting said roller eccentrically on said rotary member, whereby said knife is reciprocated upon rotation of said rotary member, said rotary member including counter-weight means to counter-balance said roller and roller mounting means.

4. In a hydraulically operated mower, a cutter bar and reciprocating knife, a housing mounted on the head of the bar with the knife reciprocably disposed between the bottom wall of the housing and the head of the bar structure, said housing having an internal slideway on the inner surface of a bottom wall thereof, a slide member in the form of a knife actuating yoke operable within the housing on said slideway, an aligned guide rod on the slide member extending through the rear end wall of the housing, means rigidly connecting the guide rod to the knife at the rear end of the housing, a crank member disposed within the housing above the slide member and having a crank pin operable in the yoke to effect reciprocation of the slide member and said yoke being adapted to be driven by a rotary hydraulically operated motor mounted upon the housing.

References Cited in the file of this patent

UNITED STATES PATENTS

| Number | Name | Date |
|---|---|---|
| 1,755,844 | Slonneger | Apr. 22, 1930 |
| 1,915,547 | North et al. | June 27, 1933 |
| 1,958,405 | Anthony et al. | May 15, 1934 |
| 2,161,357 | Kaplan | June 6, 1939 |
| 2,251,637 | Ronning | Aug. 5, 1941 |
| 2,505,296 | Miller | Apr. 25, 1950 |
| 2,603,930 | Holmes | July 22, 1952 |
| 2,616,234 | Love | Nov. 4, 1952 |

FOREIGN PATENTS

| Number | Country | Date |
|---|---|---|
| 536,742 | Great Britain | May 26, 1941 |